United States Patent [19]

College et al.

[11] Patent Number: 5,218,894

[45] Date of Patent: Jun. 15, 1993

[54] APPARATUS AND METHOD FOR CUTTING A PIN HEADER

[75] Inventors: David A. College; Kenneth F. Folk, both of Harrisburg, Pa.

[73] Assignee: AMP Incorporated, Harrisburg, Pa.

[21] Appl. No.: 785,384

[22] Filed: Oct. 31, 1991

[51] Int. Cl.⁵ .......................... B23D 45/00; B26D 7/01
[52] U.S. Cl. .......................................... 83/23; 83/42; 83/106; 83/157; 83/167; 83/268; 83/282; 83/409.2; 83/417; 83/468.6; 83/468.7; 83/929
[58] Field of Search ...................... 83/23, 42, 105, 106, 83/167, 268, 282, 375, 409.1, 409.2, 417, 444, 461, 467.1, 468.6, 929, 942, 468.7, 157, 409, 419, 27

[56] References Cited

U.S. PATENT DOCUMENTS

| | | | |
|---|---|---|---|
| 3,631,979 | 1/1972 | Frankiewicz | 83/105 X |
| 3,911,770 | 10/1975 | Boden | 83/106 X |
| 4,341,136 | 7/1982 | Parson | 83/158 |
| 4,624,160 | 11/1986 | Linker et al. | 83/409.2 X |
| 4,630,513 | 12/1986 | Keller | 83/167 X |
| 4,960,025 | 10/1990 | Fitch | 83/409.2 X |

Primary Examiner—Eugenia Jones
Attorney, Agent, or Firm—James M. Trygg; Robert J. Kapalka

[57] ABSTRACT

A machine for cutting pin headers of a desired length from a standard length of pin header stock is disclosed. A vertically disposed track is provided for receiving the standard lengths of pin header stock. The stock is allowed to fall by gravity to a cutting station where a single cutting blade cuts individual pin headers from the end of the stock. The cut pin headers are deposited into a bin for convenient unloading. Leftover, or residual pieces of stock are directed into another bin for discarding or salvage.

13 Claims, 10 Drawing Sheets

APPARATUS AND METHOD FOR CUTTING A PIN HEADER

This invention relates to apparatus for cutting connector pin headers of specific length from pin header stock.

BACKGROUND OF THE INVENTION

Connector pin headers are primarily used for interconnecting a receptacle connector to metalized circuit traces on a printed circuit board. The pin header includes a relatively long, thin insulating block having a series of pins projecting therethrough on some desired center to center spacing, 0.100 inches for example. The pins are spaced to correspond to plated through holes in the printed circuit board. The pin header is electrically and mechanically attached to the printed circuit board by inserting the shanks or solder tails of the pins of the pin header into the plated through holes until the insulating block engages the surface of the printed circuit board. The shanks of the pins are then soldered to the plated through holes when the other components are soldered to the board. The pins projecting outwardly from the pin header will then mate with a standard receptacle connector made for that purpose. Pin headers may be cut from standard length pin header stock, which may have 40 pin positions along its length and may include single, double, or triple parallel rows of pins.

The machines, available on the market today, for cutting pin headers from pin header stock either shear or saw the insulating block. In all cases the machine is arranged to accommodate the standard length pin header stock. Shearing tools or saw blades are then assembled to an arbor with appropriate spacers therebetween. Spacers and multiple cutters may be assembled to simultaneously cut several pin headers of a desired length. For example, such a machine could be set up to produce five, seven pin position pin headers from every standard length pin header stock with a residual piece left over having five pin positions. With every cycle of the machine the arbor is moved bringing the cutters into engagement with the insulating block thereby cutting the five pin headers. The residual piece is then removed, a new pin header stock inserted, and the machine again cycled. Such machines are complex in nature and require substantial skill and time to set up. Further, the residual piece must be manually removed along with the newly cut pin headers and a new length of pin header stock inserted into the machine, thereby requiring constant operator involvement.

What is needed is a pin header cutting machine that is relatively easy to set up and which may be loaded with a supply of pin header stock and left to run with minimal operator involvement.

SUMMARY OF THE INVENTION

The present invention involves a method and machine for cutting a plurality of pin headers each of a specific length from a length of pin header stock. The machine includes a frame having a loading station and a cutting station. A cutting means is provided that is movable into the cutting station for effecting the cutting of the pin header and movable away from the cutting station. A first track means is attached to the frame and has a first end at the loading station and a second end at the cutting station. The track means is arranged for receiving the length of pin header stock at the loading station and guiding it to the cutting station. A positioning means is provided for accurately positioning the pin header stock within the cutting station so that when the cutting means is moved into the cutting station only one pin header of a specific length is cut from the length of pin header stock guided by the first track means.

DESCRIPTION OF THE PREFERRED EMBODIMENT

Figure 1:
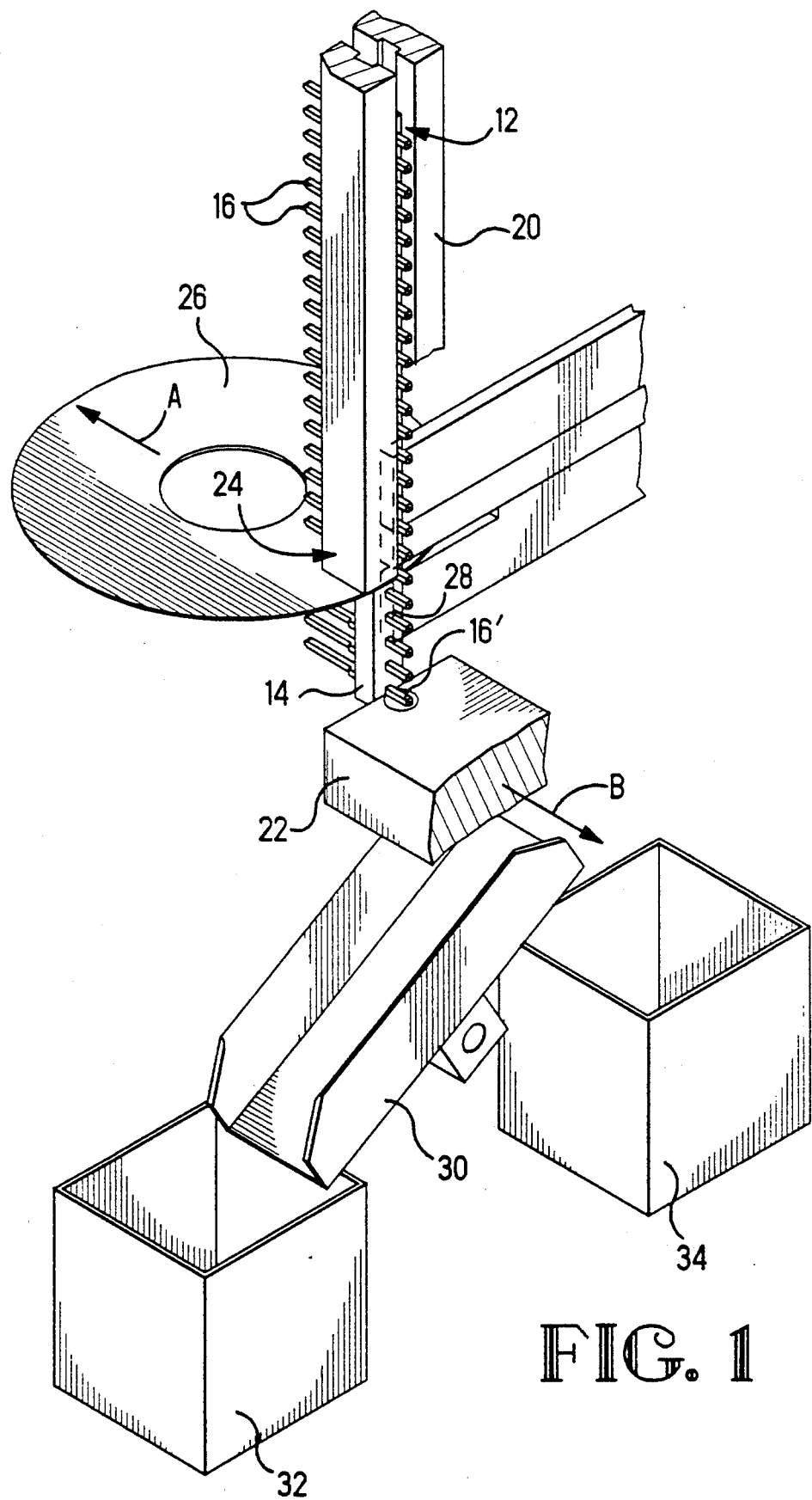
FIG. 1 is an isometric schematic view of a portion of a machine incorporating the teachings of the present invention.

A machine 10 for cutting pin headers from a length of pin header stock is shown in FIGS. 2 through 5. To aid in an understanding of the structure and operation of the machine 10, a schematic representation of some important functions of the machine is shown in FIG. 1. As shown there, a length of pin header stock 12 having a relatively long insulating block 14 and a plurality of pins 16 projecting therethrough, is arranged in an upper track 20. The lowermost pin 16' rests on a positioning block 22. There is shown a cutting station 24 where the lower end of the upper track 20 ends. A cutting blade 26 is arranged to move into the cutting station 24, as shown in FIG. 1, where a pin header 28 is cut from the length of pin header stock 12. The cutting blade 26 may then be withdrawn from the cutting station as indicated by the arrow A, the positioning block 22 withdrawn as indicated by the arrow B, and the pin header 28 allowed to fall by gravity to a deflector tray 30 which may be actuated to deflect the falling pin header into either of two containers 32 and 34. The machine 10 will now be described in detail, with reference to FIGS. 2 through 5, wherein similar identifying members indicate similar functional elements as shown in FIG. 1.

Figure 3:
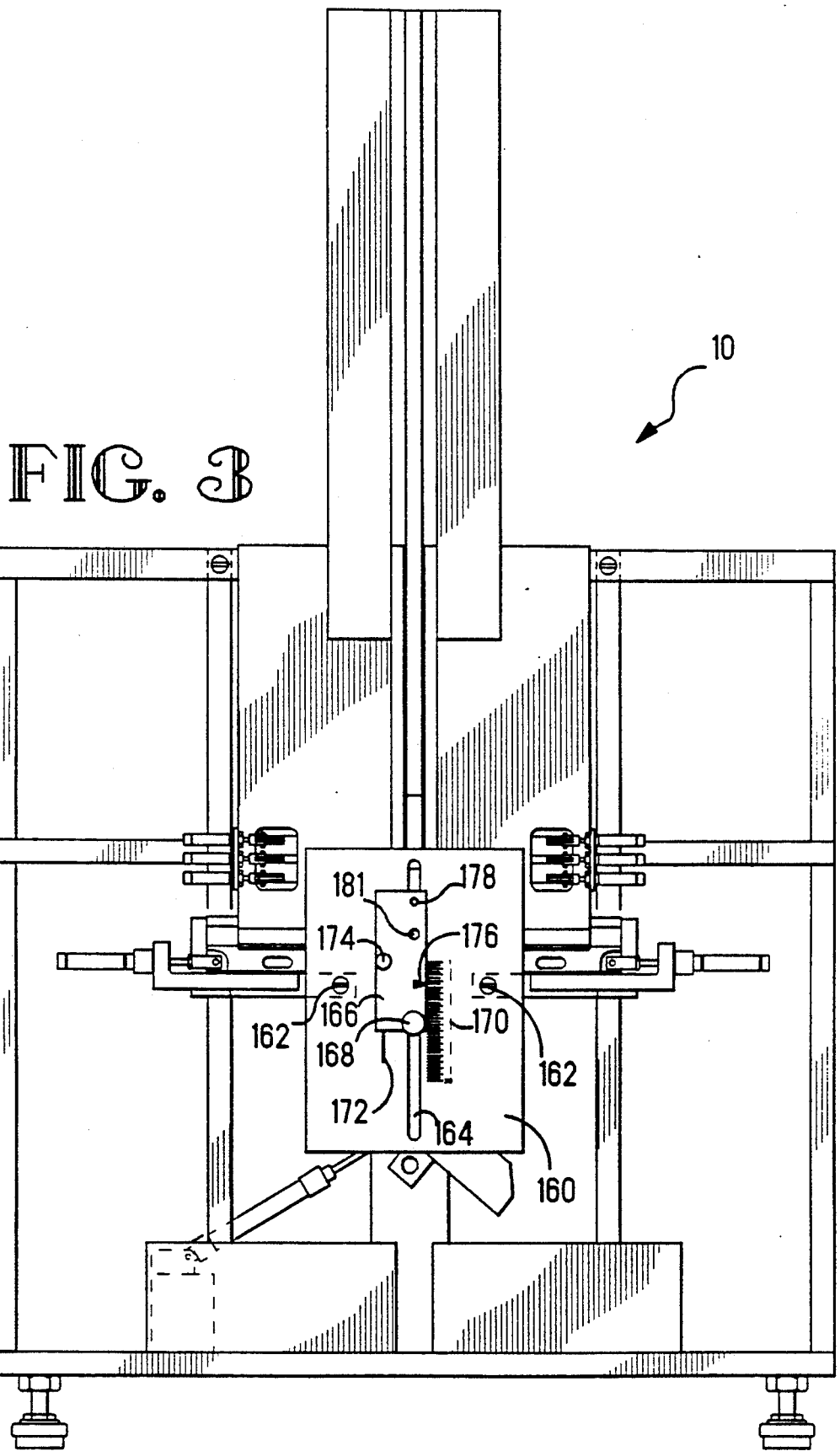
FIG. 3 is a front view of the machine of FIG. 1.
Figure 4:
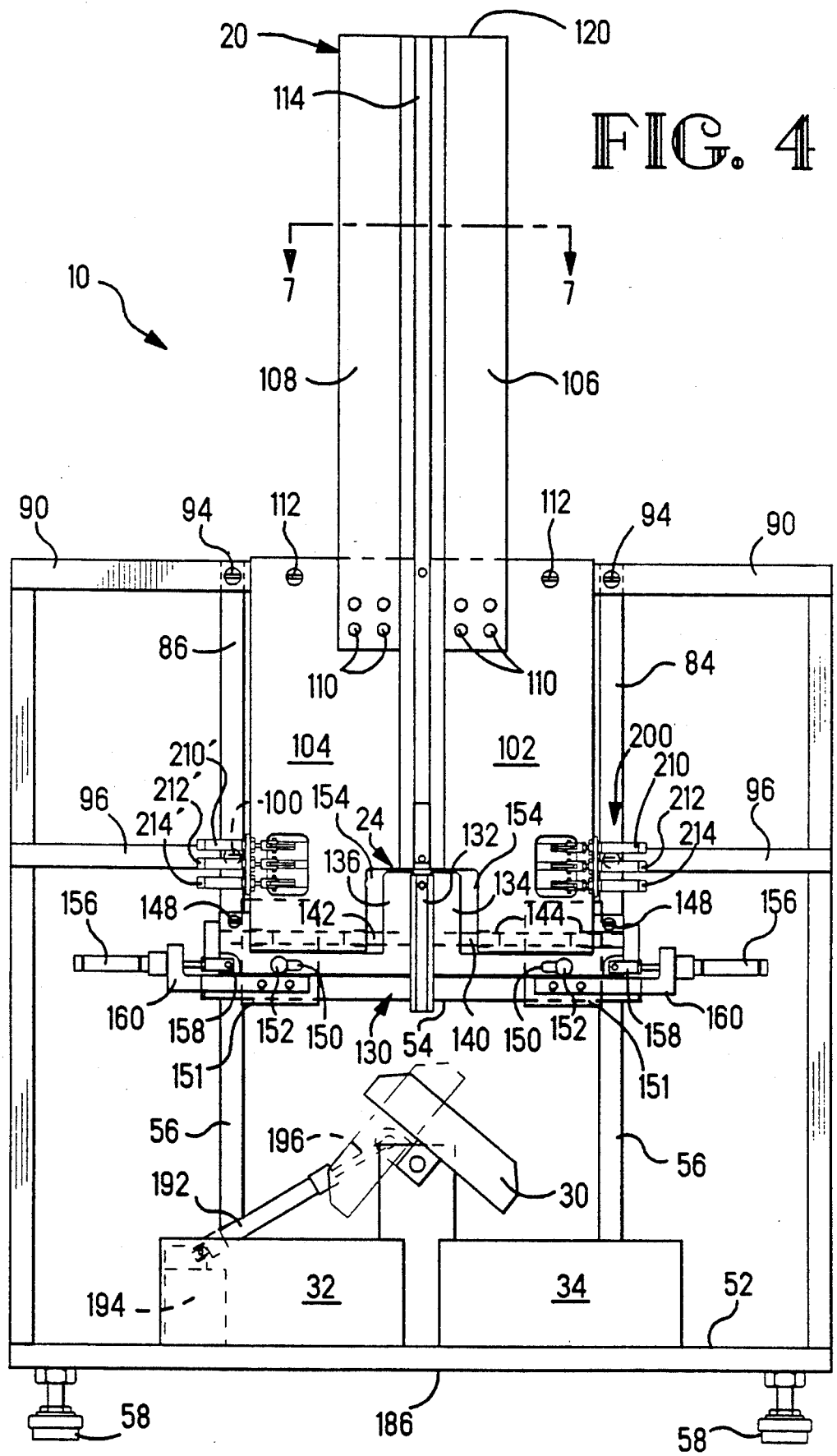
FIG. 4 is a view similar to that of FIG. 3 with a portion of the positioning mechanism removed.
Figure 5:
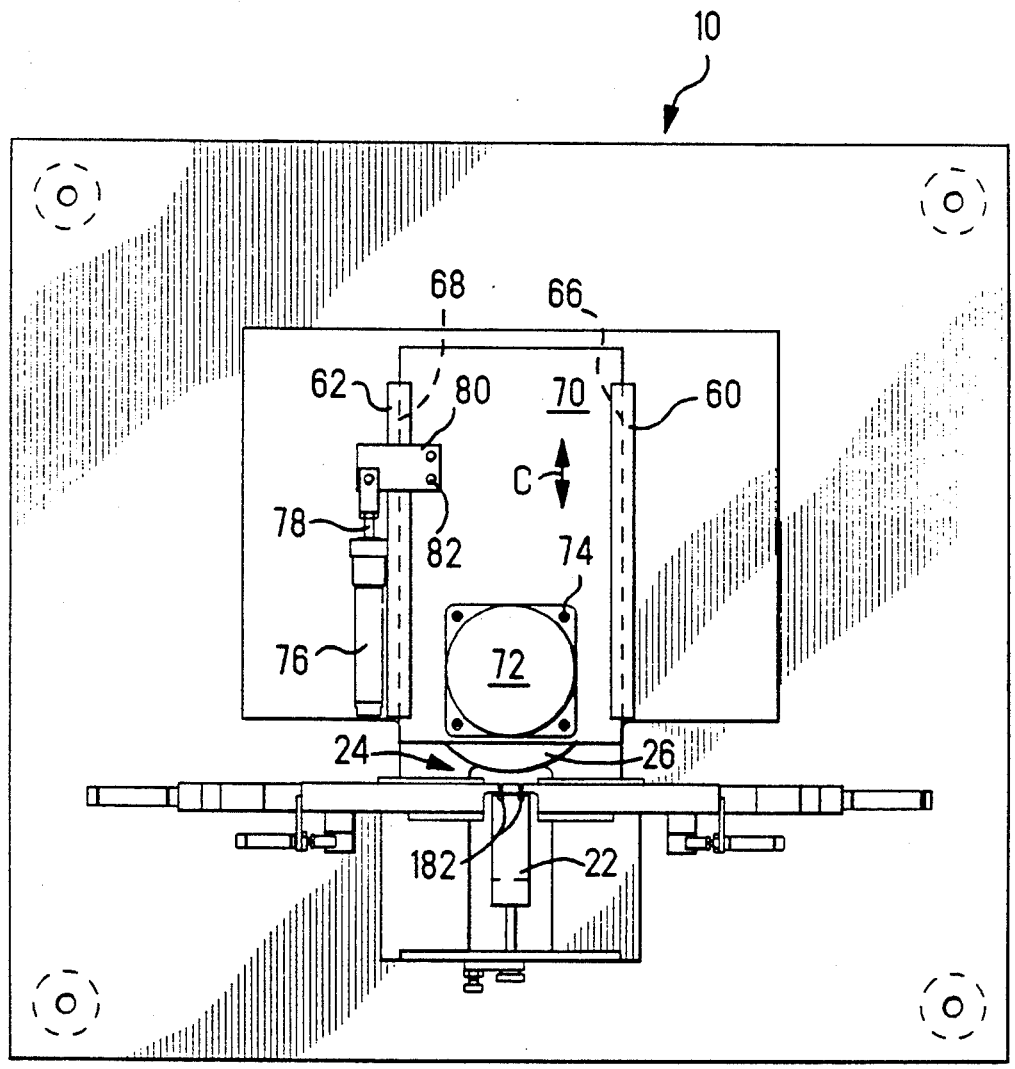
FIG. 5 is a top view of the machine of FIG. 1.
Figure 6:
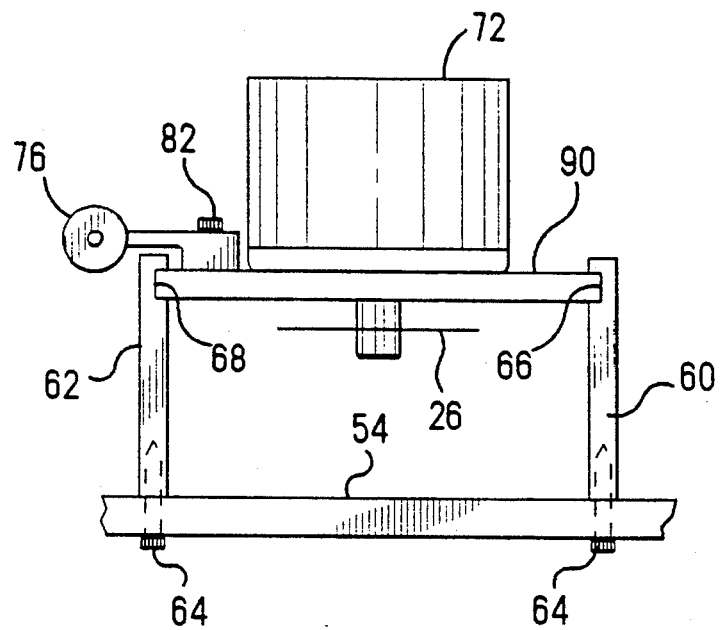
FIG. 6 is a partial cross-sectional view taken along the lines 6—6 in FIG. 2.

There is shown in FIGS. 2 through 5 a machine 10 having a frame 50 composed of a base plate 52, a top plate 54, and four posts 56. The base plate 52 and top plate 54 are rigidly attached to the four posts 56 by means of the screw fasteners 63 which are tightly threaded into the posts 56 to form a rigid frame assembly 50. Four adjustable feet 58 are provided at the four corners of the base plate 52 for leveling purposes in the usual manner. A pair of vertically disposed rectangularly shaped plates 60 and 62 are secured to the top plate 54 by means of the screw fasteners 64. A pair of grooves 66 and 68 are formed in the opposing surfaces of the rectangular plates 60 and 62 respectively, as best seen in FIG. 6. These opposed grooves 66,68 form ways for receiving and guiding sliding movement of a slide 70 in the directions of the arrow C, as best seen in FIG. 5. A drive motor 72 is secured to the slide 70 by means of the screw fasteners 74 and includes a drive shaft projecting downwardly through a clearance hole in the slide 70. The cutting blade 26 is secured to and rotates with this drive shaft directly under the slide 70, as viewed in FIG. 6. A linear actuator 76, an air cylinder in the present example, has its cylinder secured to the rectangular plate 62 and its piston rod 78 coupled to the slide 70 by means of the bracket 80 which is attached to the slide 70 by means of the screw fasteners 82. By actuating the air cylinder 76, the slide 70 can be made to move in the directions indicated by the arrow C so that the blade 26 may enter the cutting station 24 or it may withdraw from the cutting station.

Figure 2:
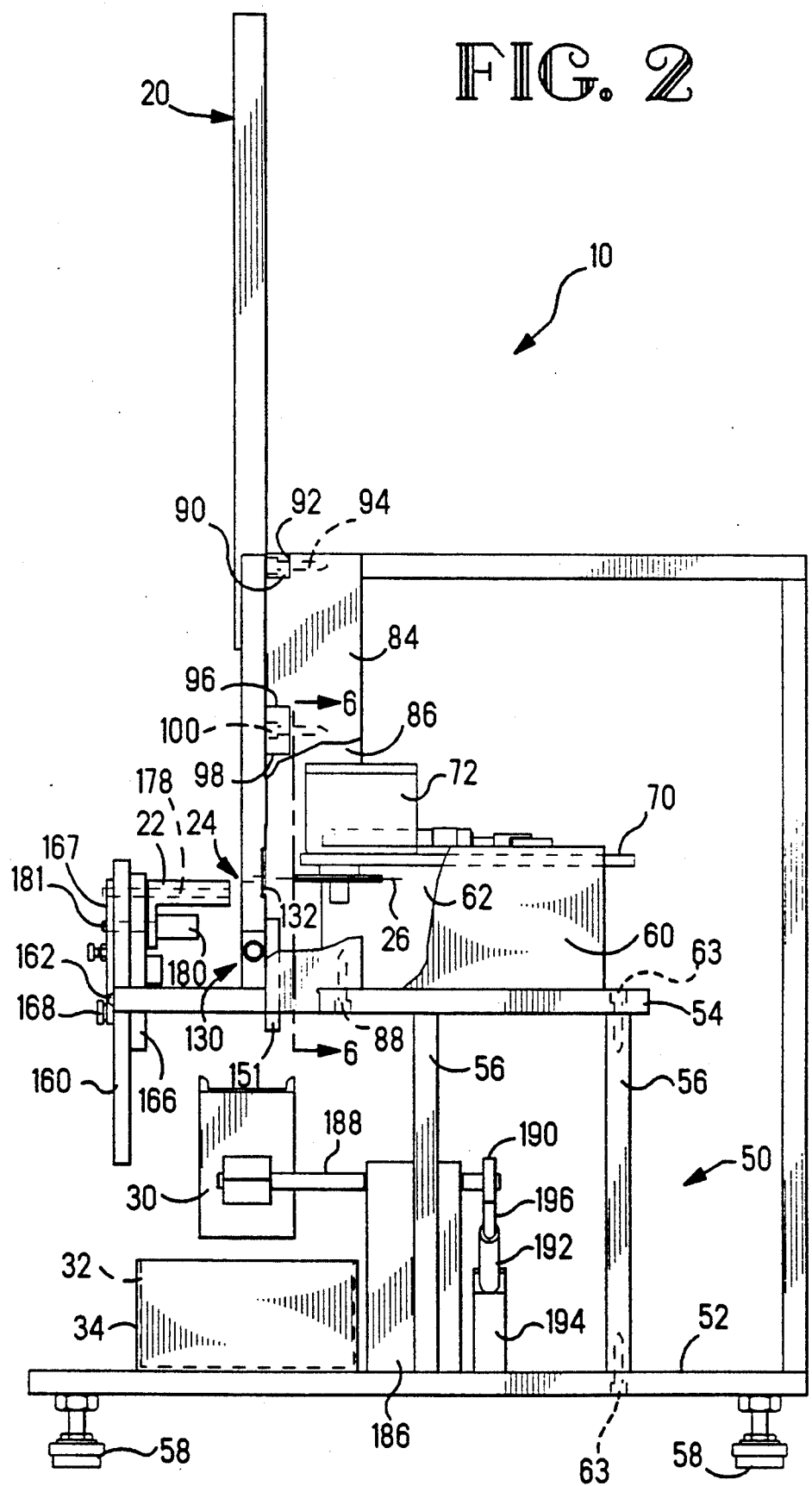
FIG. 2 is a side view of the machine of FIG. 1.

A pair of upright members 84 and 86 are secured to the top plate 54 by means of the screw fasteners 88 as shown in FIGS. 2 and 4. An upper support bar 90 is disposed transverse to the upright members 84 and 86 within notches 92 formed in the uppermost corners of the members and secured in place with a pair of screws 94 as shown. A lower support bar 96 is disposed within notches 98 formed in the upright members 84 and 86 substantially parallel to the upper support bar 90 and secured in place with the screws 100.

Figure 7:
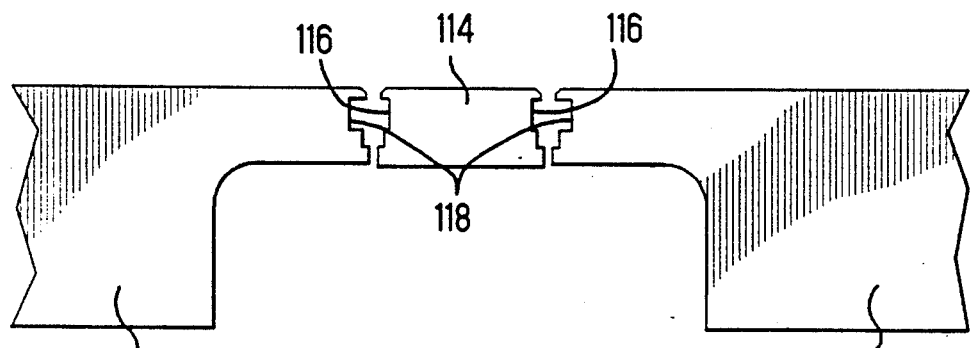
FIG. 7 is a cross-sectional view of the track taken along the lines 7—7 in FIG. 4.

As shown in FIGS. 2, 4, and 7, there is an upper track 20 consisting of right and left track support plates 102 and 104 and right and left track extensions 106 and 108 respectively. The track extensions are rigidly attached to their respective track support plate by means of the screw fasteners 110. The track support plates 102 and 104 are attached to the upper support bar 90 with the screws 112 and to the top plate 54 with screws that are not shown. A central track member 114 is arranged between the two track extensions and track support plates as best seen in FIGS. 4 and 7. A longitudinally disposed groove 116 is formed in each of the two opposite edges of the central track member 114 and a corresponding groove 118 is formed in the opposing surfaces of the two track extensions 106 and 108 and of the track support plates 102 and 104, as best been in FIG. 7. The two grooves 116 and 118 are shaped to be slightly larger than the cross-sectional shape of the insulating block 14 of a length of pin header stock 12 so that the pin header stock will slide freely within the grooves. Additionally, the track support plates 102,104 and the track extensions 106,108 are spaced from the central track member 114 by an amount to allow the pins 16 of the length of pin header stock 12 to freely pass along the entire length of the upper track 20. The uppermost end of the upper track 20, as viewed in FIG. 4, constitutes a loading station 120 where the pin header stock 12 is inserted into the upper track 20 and allowed to fall by gravity, within the confines of the grooves 116,118, toward the cutting station 24.

Figure 9:
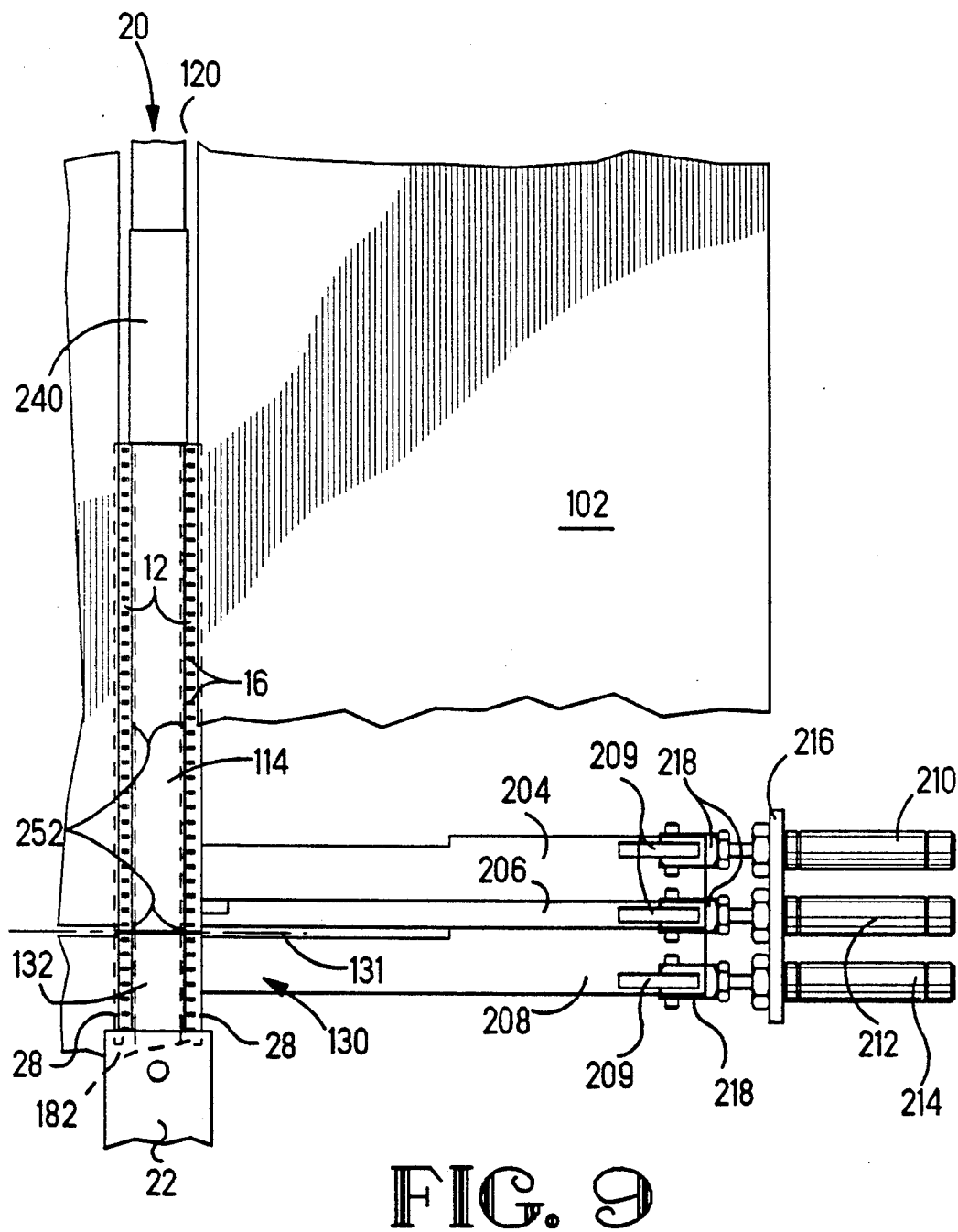

A lower track 130 is arranged below the cutting station 24 and includes a lower central track member 132, similar in cross section to the member 114 and right and left movable, or retractable, lower tracks 134 and 136, each being disposed on either side of the lower central track member 132 as shown in FIG. 4. The lower central track member 132 is rigidly attached to the top plate 54 with the central track member 114 being in precise alignment therewith. The opposite faces of the lower member 132 contain grooves similar to the grooves 116 while the adjacent opposing faces of the right and left lower tracks 134,136 contain grooves similar to the grooves 118 for receiving and confining the pin header stock 12 in proper position during the cutting operation. Additionally, the right and left lower tracks 134,136 are spaced from the lower central track member 132 by an amount that allows the pins 16 to freely pass along the entire length of the lower track 130 when the right and left lower tracks 134 and 136 are each moved inwardly toward the member 132 to their full limit of travel to a position adjacent the member 132. Therefore, in this position, as shown in FIG. 4, the lower track 130 is in alignment with the upper track 20 so that a length of pin header stock 12 may pass freely from the upper track 20, through the cutting station 24, and into the lower track 130. Additionally, the lower track 130 is spaced from the upper track 20 by an amount that is slightly larger than the thickness of the cutting blade 26 to provide clearance therefor during the cutting operation, the cutting occurring along a cut line 131, as best seen in FIG. 9. The right and left lower tracks 134,136 each slide by means of rods 140 and 142 respectively. A pair of bushings 144 are pressed into each of the track support plates 102 and 104 and arranged so that the rods 140 and 142 will slide freely therein. As is shown in FIG. 4, the lower tracks 134 and 136 are U-shaped with the rods 140,142 extending into bores in each of the legs. The bores furthest from the lower central track member 132 are split with lock screws 148 for securely clamping the lower tracks 134 and 136 to the rods 140 and 142 respectively. Each of the lower tracks 134 and 136 includes an elongated opening 150 having a longitudinal axis parallel with its respective rod 140,142, and a shoulder screw 152 extending therethrough and threaded into a bracket 151 which is secured to the back of the track support plate 102 as best seen in FIGS. 2 and 4. The length of the shoulder screws 152 is chosen to permit side to side sliding motion of the lower tracks 134,136 while minimizing lateral play between the parts. Each of the track support plates 102 and 104 include a cutout 154 to accommodate the side to side sliding movement of the lower tracks 134 and 136. A pair of air cylinders 156 have their piston rods coupled to the lower tracks 134 and 136 by means of a pin and clevis 158 in the usual manner, and their cylinders secured to the brackets 151 by means of the brackets 160. The air cylinders 156 are arranged to effect the side to side sliding movement of the lower tracks 134 and 136 from their fully inward position adjacent the lower central track member 132, as shown in FIG. 4, to their withdrawn position within the cutouts 154.

There is shown in FIGS. 2 and 3, a positioning plate 160 which is rigidly attached to the front edge of the top plate 54 by the screw fasteners 162. A vertically disposed slot 164 is formed completely through the positioning plate. A slide member 166 having a portion that projects into the slot 164 is arranged to slide freely along the entire length of the slot. A thumb screw 168 and clamp member 167 are provided to securely clamp the slide member 166 in any desired position along the slot 164. A set of graduations 170 are on the face of the positioning plate 160 and are marked 1 through 39. A set of thirty-nine index holes 172 are formed through the positioning plate 160 in a straight line parallel with the slot 164. The spacing of the index holes is identical to the spacing of the graduations 170. A spring loaded index pin 174 is arranged captive to the clamp member 167 and includes a projection that extends into one of the index holes 172. The pin 174 may be manually pulled outwardly against the force of its spring until the projection clears the index hole and the slide member 166 and clamp member 167 repositioned so that the projection enters another index hole 172. An arrow 176 on the clamp member 167 points to the numbered graduation that corresponds to the index hole 172 containing the index pin projection. A rod 178 being pressed into and extending through the slide member 166 and into slip fit engagement with the clamp member 167, projects outwardly toward the lower central track member 132 and normal to the plate 160, as best seen in FIG. 2. The positioning block 22 has a bore therethrough through which the rod 178 extends as shown. The bore is a close slip fit with the rod 178 so that the positioning block 22 will slide freely along the rod to a position adjacent and very close to the lower central track member 132, as shown in FIG. 5 and to another position withdrawn from the member 132, as shown in FIG. 2. An air cylinder 180 is secured to the positioning block 22 and has its piston rod extend through clearance holes in both the positioning block and clamp 167, through the slot 164 and into abutting engagement with the slide member 166. A shoulder screw 181 extends through a clearance hole in the clamp member 167, the slot 164, and a clearance hole in the slide member 166, and engages a threaded hole in the end of the piston rod thereby attaching the piston rod to the slide member 166. When the air cylinder 180 is actuated, the positioning block 22 will be made to slide to its position adjacent the member 132 and its withdrawn position. A pair of proximity sensors 182 are embedded in the positioning block 22, as best seen in FIG. 5, for sensing the presence of a pin header in either side of the upper track 20.

There is shown in FIGS. 2 and 4 a mounting block 186 having a shaft 188 pivotally journaled therein. The deflector tray 30 is attached to one end of the pivotal shaft 188 and a crank 190 is attached to the other end. An air cylinder 192, which is attached to a second mounting block 194 in any suitable manner, has its piston rod 196 coupled to the crank 190 so that the air cylinder may pivot the tray 30 to a first position shown in solid lines and to a second position shown in phantom lines in FIG. 4.

Figure 8:
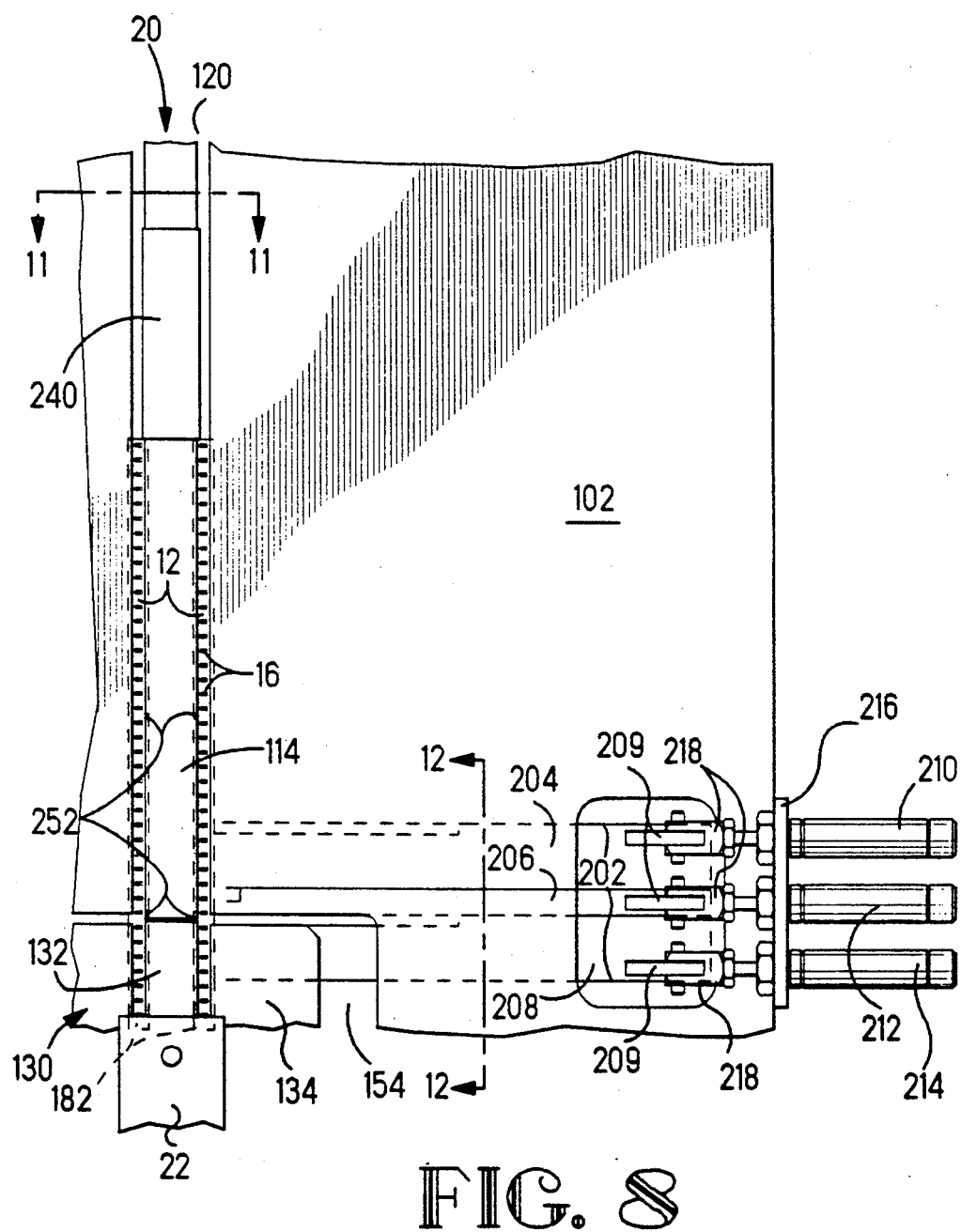
FIGS. 8, 9, and 10 are enlarged views of the clamping mechanism enclosed in phantom lines and indicated as 8 in FIG. 4.
Figure 10:
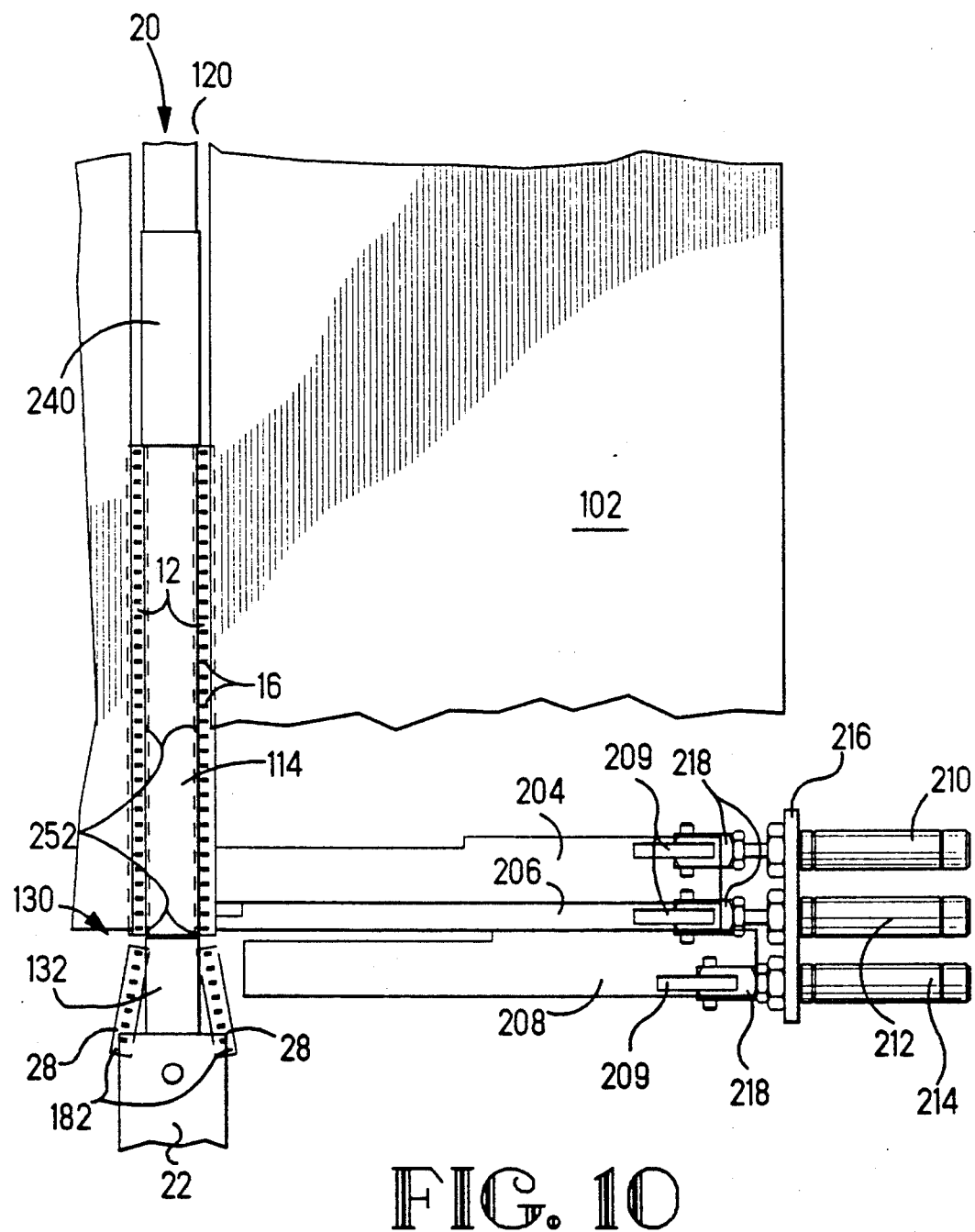
Figure 12:
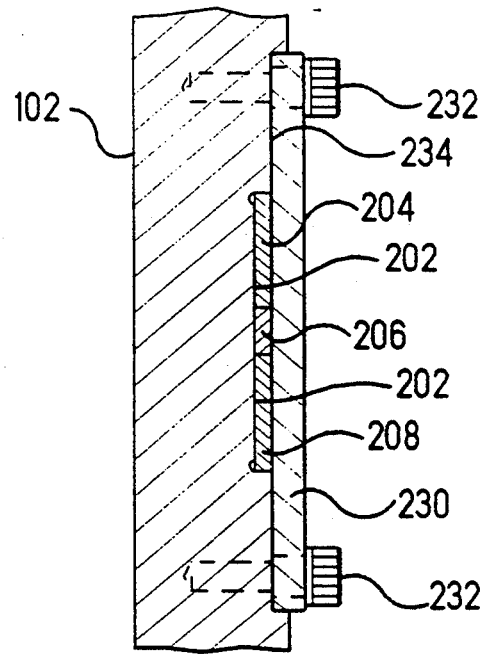
FIG. 12 is a partial cross-sectional view taken along the lines 12—12 of FIG. 8.

There is shown in FIGS. 8, 9, and 10 an enlarged view of a portion of the machine 10 indicated at 200 in FIG. 4. Here is shown the mechanism for clamping the length of pin header stock 12 during the cutting operation. Since the upper track 20 and the lower track 130 are arranged to accept two columns of pin header stock 12, one column being to the right of the central track member 114 and the other being to the left thereof, there must be a clamping mechanism for each. What is shown in FIGS. 8, 9, and 10 and described below is the clamping mechanism on the right. It will be understood that a similar clamping mechanism is provided on the left as well. FIG. 12 is a cross-sectional view taken along the lines 12—12 in FIG. 8 and should be referenced during the following description. A horizontally disposed slot 202 is provided in the back surface of the right track support plate 102. Three rectangularly shaped sliding clamps, a top clamp 204, a center clamp 206, and a bottom clamp 208, are arranged to slide independently within the slot 202. Each clamp includes a tang 209 projecting outwardly from the end thereof furthest from the central track 114. Three air cylinders 210, 212, and 214 are attached to the right track support plate 102 by means of the bracket 216 and have their piston rods coupled to the tangs 209 of the clamps 204, 206, and 208 respectively. Each of these couplings are effected by a pin and clevis 218 in the usual manner. A cover plate 230 is attached to the back of the right track support plate 102 by means of the screw fasteners 232. The cover 230 fits into a recess 234 formed in the plate 102 and serves to close the slot 202 thereby holding the clamps 204, 206, and 208 captive while permitting smooth side to side movement of the clamps when the cylinders 210, 212, and 214 are actuated. A similar arrangement of clamps 204', 206', and 208' and cylinders 210', 212', and 214' are provided with the left track support plate 104 as shown in FIG. 4.

Figure 11:
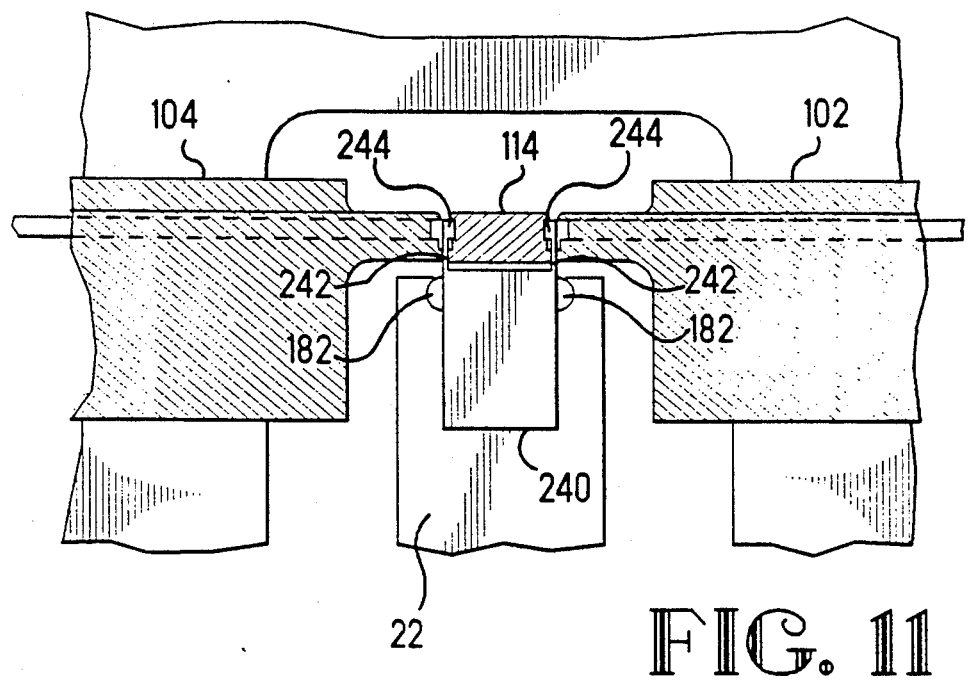
FIG. 11 is a partial cross-sectional view taken along the lines 11—11 of FIG. 8.

As shown in FIGS. 8 and 11, a weight 240 is provided having four legs 242 and feet 244 which loosely engage the grooves 116 in the upper track 20. The weight 240 is intended to assure that the pin header stock 12 is in locating engagement with the positioning block 22 during the cutting operation.

The operation of the machine 10 is controlled by a microprocessor, not shown, by means of pneumatic transducers which in turn control air flow to the various air cylinders in the usual manner. It will be understood that any suitable microprocessor and transducer arrangement may be used to effect control of the machine 10 in accordance with the operating steps defined below.

In operation, the thumb screw 168 is loosened and the index pin 174 is pulled outwardly allowing the slide 166 to be positioned to the desired setting for the pin headers to be made. The index pin is then seated in the appropriate hole 172 and the thumb screw tightened. Several standard lengths of pin header stock 12, 40 pin stock in the present example, are then loaded into each side of the upper track 20 at the loading station 120. These are permitted to fall by gravity until the lower pin of the lower length of stock on each side engages the positioning block 22 in alignment with the sensors 182, as best seen in FIG. 8. The weight 240 is then inserted into the grooves 116 at the loading station 120 so that the weight rests on the two stacks of pin header stock 12. It will be understood that, while two stacks of pin header stock 12 are shown in the upper track 20, the machine 10 will function perfectly well with only one stack in either side.

The operator will then input to the computer the desired number of pin positions in the pin headers 28 that are to be made which corresponds to the position of the slide 166. In the present example, the arrow 176 of the slide 166, as shown in FIG. 3, is set to the graduation marked "7" indicating the pin headers 28 having seven pin positions are to be cut from the stock 12. The operator then initiates machine operation causing the cylinders 210, 210', 212, 212', 214, and 214' to urge their respective clamps 204 through 208' to their closed positions to clampingly engage the header stock 12 in the track 20. The motor 72 is caused to rotate the cutting blade 26, and the cylinder 76 is actuated to advance the slide 70 and rotating cutting blade 26 toward the stock 12 in the cutting station 24. This motion continues until the cutting blade cuts through the stock 12 in each stack thereby creating a single pin header 28 at the bottom of each stack, as best seen in FIG. 9. The two cylinders 156 and the cylinder 180 are concurrently actuated causing the right and left lower tracks 134 and 136 to withdrawn away from the lower central track member 132 and the positioning block 22 to withdraw to the position shown in FIG. 2. The cylinders 214 and 214' then cause the clamps 208 and 208' to move away from the lower central track member 132 to their open positions thereby releasing the two pin headers 28 to fall by gravity against the deflector tray 30 and into the bin 34. The cylinders 156 and 180 are actuated to cause the right and left tracks 134 and 136 to again move to their closed positions shown in FIG. 4, and the positioning block 22 to move to its position shown in FIG. 5. The cylinders 210 through 212' are then actuated to move the clamps 204 through 208' to their open positions away from the central track member 114 allowing the two stacks of header stock 12 to fall by gravity until the lower pin of the lower length of stock on each side engages the positioning block 22, this being sensed by the computer by means of the sensors 182. The cylinders 210 through 214' are then actuated to again urge their respective clamps 204 through 208' into their closed positions and another pin header 28 is cut from each stack and deposited into the bin 34. This process continues until a total of five pin headers 28 are cut from each stack. The individual lengths of pin header stock 12 from which the pin headers 28 are cut have, as previously stated, forty pin positions. After removing five pin headers having seven pin positions each, a residual piece 250 of stock having only five pin positions remains and must be discarded. This is accomplished by withdrawing the clamps 204 through 208' to allow the piece 250 to fall to the positioning block 22 and the clamps returned to their closed positions. At this point the right and left lower track supports 134 and 136 and the positioning block 22 are all withdrawn, as is done after a pin header 28 is cut, and the clamps 208 and 208' withdrawn so that the residual piece of stock 250 is allowed to fall by gravity toward the deflecting tray 30. However, the deflecting tray 30 has been pivoted by the cylinder 192 to the position shown in phantom lines in FIG. 4 so that the residual piece 250 is deflected into the bin 32. At this point the right and left tracks 134 and 136 are moved to their closed positions and the positioning block 22 moved to its position shown in FIG. 5. The clamps 204 through 208' are again withdrawn to allow the next length of pin header stock 12 in each stack to fall until the lower pin in each stack engages the positioning block 22. The original process is then repeated on the next full length of pin header stock 12 until the fifth pin header 28 is cut and deposited into the bin 34 and then the residual piece 250 is deposited into the bin 32. This process is repeated until the desired number of pin headers 28 is cut.

The top and center clamps 204 and 206 on the right side and the top and center clamps 204' and 206' on the left side are actuated together except when the residual piece 250 has less than three pin positions, as would be the case when pin headers having 3 or 13 pin positions were being cut. In this case when the last pin header is cut from the stock and dropped into the bin 34, the center clamps 206 and 206' are then opened allowing the small residual piece 250 to fall into the bin 32. This variation in the procedure avoids the possible problem of the relatively short residual piece cocking within the opening between the upper and lower tracks 20 and 130.

An additional important feature of the present machine 10 is that the upper track 20 is tall enough so that as the pin header stock is used by the machine additional stock may be loaded into the track while the machine is operating. When the weight 240 reaches a point just prior to the cutting zone its presence is sensed by the computer and the machine momentarily stopped. At this point the operator removes the weight 240 through exit openings 252 that are in the lower end of the central track member 114 and again inserts the weight into the top of the track 20. Machine operation is again initiated and production continues.

An important advantage of the present invention is that there is no requirement to set up multiple cutting blades on exact spacings since only a single pin header is cut at one time from the end of a length of pin header stock and then the stock advanced for the next cut. This results in the additional advantages that the stock is much easier to load into the machine and the finished parts can be automatically directed into a bin for easy unloading.

We claim:

1. A machine for cutting a plurality of pin headers each of a specific length from a length of pin header stock comprising:

(a) a frame having a loading station and a cutting station;
    (b) cutting means movable into said cutting station for effecting said cutting of said pin header along a desired cut line and movable away therefrom;
    (c) first upper track means attached to said frame, having a first end at said loading station and a second end at said cutting station, for receiving said pin header stock at said loading station and guiding it to said cutting station;
    (d) first lower track means comprising a stationary track member rigidly coupled to said frame and a retractable lower track member movably coupled to said frame, which together form a confining and guiding track opening in alignment with said first upper track means for receiving and confining said pin header stock during cutting; and
    (e) adjustable positioning means for accurately positioning said pin header stock within said cutting station so that when said cutting means is moved into said cutting station only one said pin header of a specific length is cut from said pin header stock guided by said first upper track means, said positioning means having a positioning member which is movable between a first position adjacent said cutting station wherein said pin header stock is positionable on said positioning member, and a second position away therefrom after said cutting of said pin header to permit the cut pin header to fall by gravity away from said cutting station, said positioning member being immovably disposed in said first position whenever said cutting means is within said cutting station.

2. The machine according to claim 1 wherein said loading station is disposed vertically above said cutting station and said pin header stock is urged by gravity to move along said first upper track means from said loading station to said cutting station and into engagement with said positioning means.

3. The machine according to claim 2 wherein said retractable track member is arranged to move away from said stationary track member after said cutting of said pin header to permit the cut pin header to fall by gravity away from said cutting station.

4. The machine according to claim 2 wherein said first upper and lower track means each include a pair of opposing grooves arranged to confiningly receive said length of pin header stock, said upper track means arranged to guide said stock to said cutting station and said lower track means arranged to receive and confine said stock during the cutting thereof.

5. The machine according to claim 2 including a second upper track means for receiving another said pin header stock at said loading station and guiding it to said cutting station, said second upper track means being parallel with and adjacent said first upper track means and substantially similar thereto, and including a second lower track means for receiving and confining said another pin header stock during said cutting, said second lower track means being parallel with and adjacent said first lower track means and substantially similar thereto.

6. The machine according to claim 5 wherein said cutting means is arranged for concurrently effecting said cutting of both said pin header from said pin header stock and said pin header from said another pin header stock.

7. The machine according to claim 2 including clamp means for holding said pin header stock in position during said cutting of said pin header and for holding said pin header stock and said cut pin header immediately thereafter.

8. The machine according to claim 7 wherein said clamp means comprises a first clamp member for engaging and clamping said pin header stock above said cut line and a second clamp member for engaging and clamping said pin header stock below said cut line.

9. The machine according to claim 8 wherein said clamp means includes a third clamp member disposed between said first clamp member and said cut line for engaging and clamping said pin header stock having a length less than said specific length of said pin header.

10. The machine according to claim 9 wherein said first clamp member is of rectangular shape and is arranged to slide within a slot formed in said frame in a direction toward and away from said first upper track member and wherein said second clamp member is of rectangular shape and is arranged to slide within the slot formed in said frame in a direction toward and away from said first lower track member.

11. The machine according to claim 1 wherein said cutting means includes only one cutting blade and a drive means for driving said one cutting blade for effecting said cutting of said pin header.

12. The machine according to claim 1 including deflecting tray means for deflecting pin headers having a length substantially equal to said specific length into one bin and pin headers having a length less than said specific length into another bin.

13. In a method of cutting a plurality of pin headers having a specific length from a plurality of standard lengths of pin header stock by means of a cutting machine having an upper track for receiving said standard lengths of pin header stock at a loading station and guiding them to a cutting station vertically below said loading station, a cutting blade for cutting said stock along a cut line, a lower track for receiving and confining said stock below said cut line, clamp means for holding said stock during cutting and for holding the pin header after cutting, positioning means for positioning said stock for cutting said pin header having said specific length, the steps of comprising:

(a) loading a plurality of standard lengths of pin header stock into said upper track at said loading station wherein a lowermost length of said pin header stock abuts said positioning means;

(b) causing said clamp means to clamp a lowermost portion of stack pin header stock in cutting position;

(c) causing said cutting blade to cut the lowermost clamp portion along said cut line to form a remaining uncut portion above said cut line and a cut pin header of desired length below said cut line;

(d) causing said clamp means to release said cut pin header so that it falls by gravity away from said cutting station;

(e) deflecting said cut pin header into a first bin;

(f) causing said clamp means to release said remaining uncut portion so that it falls by gravity until it abuts said positioning means;

(g) repeating steps (b) through (f) until a final remainder of said lowermost length of pin header stock has a length less than said specific length, at which point causing said clamp means to release said final remainder of said lowermost length of stock so that it falls by gravity away from said cutting station;

(h) deflecting said final remainder into a second bin;

(i) causing a next lowermost length of said pin header stock to fall by gravity until it abuts said positioning means;

(j) repeating steps (b) through (i) until each of said plurality of standard lengths of pin header stock have been cut into said cut pin headers and a last said final remainder has been deflected into said second bin.

* * * * *